Figure 3:
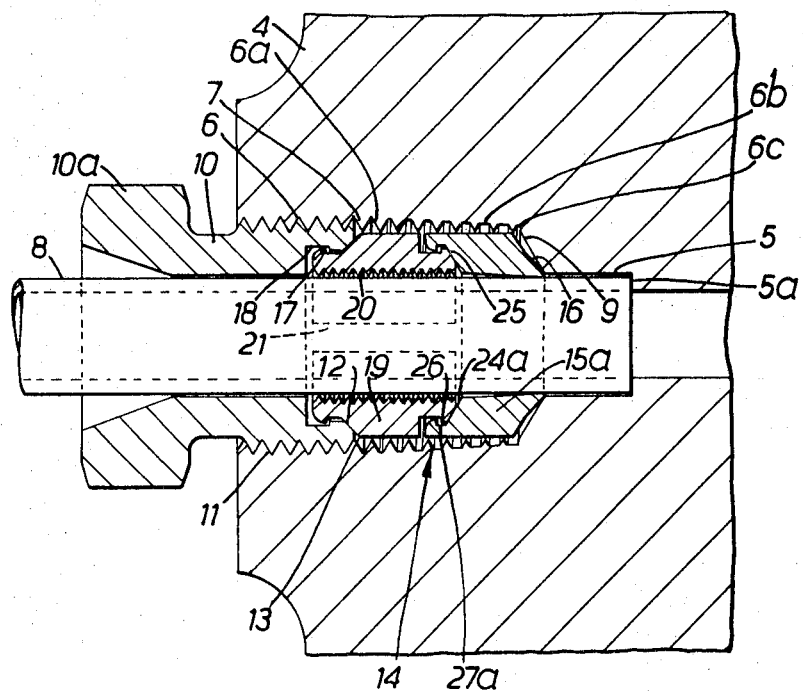

United States Patent

[11] 3,582,115

| [72] | Inventor | John Henry Clague<br>Douglas, Isle of Man, British Isles, Great Britain |
|---|---|---|
| [21] | Appl. No. | 695,475 |
| [22] | Filed | Jan. 3, 1968 |
| [45] | Patented | June 1, 1971 |
| [73] | Assignee | Mannin Engineering Limited<br>Isle of Man, British Isles, Great Britain |
| [32] | Priority | Aug. 26, 1967 |
| [33] | | Great Britain |
| [31] | | 39370/67 |

[54] MEANS FOR COUPLING A PIPE TO A COMPONENT CARRYING FLUID
10 Claims, 3 Drawing Figs.

[52] U.S. Cl. .................................................. 285/341, 285/382.2
[51] Int. Cl. ................................................... F16l 19/06
[50] Field of Search .......................................... 285/382, 382.1, 382.2, 382.7, 341, 342, 343, 339, 379

[56] References Cited
UNITED STATES PATENTS

| 1,883,283 | 10/1932 | Zerk | 285/343X |
| 2,320,813 | 6/1943 | Cowles | 285/382.7X |
| 3,074,747 | 1/1963 | Boughton | 285/342 |

*Primary Examiner*—David J. Williamowski
*Assistant Examiner*—Wayne L. Shedd
*Attorney*—Young & Thompson ABSTRACT: Means for coupling a pipe to a component comprises a hollow stud which is a sliding fit on the pipe, said hollow stud being headed at one end and provided with an externally screwed shank at the other end to thread into a tapped bore in the component. Gripping and sealing means including a longitudinally split portion and a nonsplit portion are interposed between the end of the screwed shank and the seat in the component, so that when the stud is screwed into the component, end load is applied by the screwed shank to the gripping and sealing means to cause the nonsplit portion to seal against the pipe and the seat and the longitudinally split portion to grip the pipe.

PATENTED JUN 1 1971
3,582,115
SHEET 1 OF 2
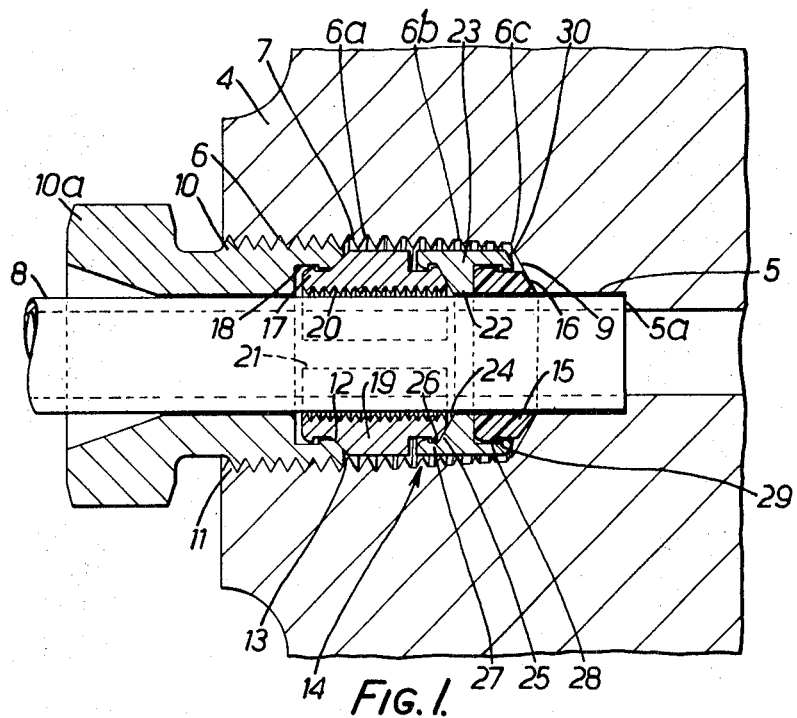
FIG. I.
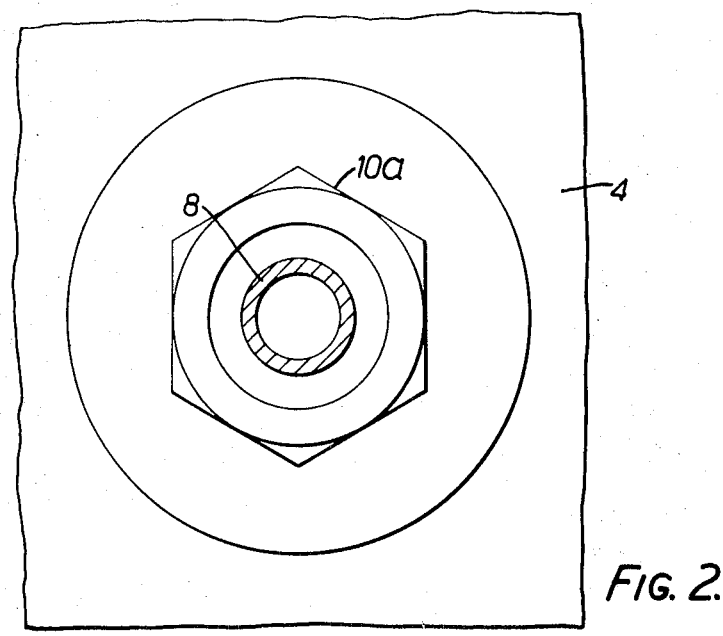
FIG. 2.
INVENTOR
JOHN HENRY CLAGUE
BY
Young + Thompson
ATTORNEYS

MEANS FOR COUPLING A PIPE TO A COMPONENT CARRYING FLUID

This invention relates to means for coupling a pipe to a component carrying fluid, such as a pump, valve, ram, motor or other accessory. The invention finds particular, though not exclusive, application to high pressure systems, especially high pressure hydraulic systems.

The means generally used for coupling pipes to such components as aforesaid comprises a number of separate parts which often protrude to a considerable extent beyond the face of the component. The main object of the present invention is to provide an improved arrangement giving a simpler, lower cost and more compact coupling means than those at present in general use.

With this object in view, in accordance with the invention, means for coupling a pipe to a component comprises a hollow stud which is a sliding fit on the pipe, said hollow stud being headed at one end and provided with an externally screwed shank at the other end to thread into a tapped bore in the component, and gripping and sealing means including a longitudinally split portion and a nonsplit portion interposed between the end of the screwed shank and a seat in the component, the arrangement being such that when the stud is screwed into the component end load is applied by the screwed shank to the gripping and sealing means to cause the nonsplit portion to seal against the pipe and the seat and the longitudinally split portion to grip the pipe.

The gripping and sealing means preferably comprises separate parts, an externally tapered and longitudinally split pipe-gripping collar and a nonsplit sealing member. Preferably the end of the screwed shank and/or the seat is tapered whereby the aforesaid end load not only presses the sealing member into engagement with the seat to effect sealing against the pipe and the seat but also acts to effect radial elastic contraction of the collar to grip the pipe, such that on release of the end load the pipe will be released and become withdrawable from the coupling. Thus, the screwed shank may have an internal tapered surface which engages with a corresponding external tapered portion of the collar. Further, the seat may be tapered and the end of the sealing member which seats thereon may also be correspondingly tapered so that said sealing member is pressed into wedging engagement with the seat.

In another arrangement the split collar may also be oppositely tapered at its other end and the sealing member then contacts the split collar by means of a tapered surface so that the split collar is radially compressed at both its ends.

It is desirable that the coupling means should be capable of being held in stores and supplied as a one-piece assembly and this may be achieved by attaching the gripping and sealing means to the stud to form a single unit. Thus, the gripping and sealing means may form a reduced diameter extension of the screwed shank of the stud. The collar may be sprung into engagement with the stud; further the sealing member may be sprung into attachment to the collar. Preferably the screwed shank of the stud is formed with a rebate adjacent its internal tapered surface so that the tapered portion of the longitudinally split collar may be pressed into the stud and there retained elastically. In this way the stud, collar and sealing member form a one-piece assembly.

In certain applications of the coupling means the sealing member may be of metal, whereas in others a nonmetallic sealing member is desirable. When a nonmetallic sealing member is employed the arrangement is preferably such that it is trapped in order to prevent its extrusion. If desired a nonsplit washer may be interposed between the sealing member and the collar. Sometimes it may be desirable to attach the sealing member to a nonsplit carrier which is sprung into engagement with the collar. In this arrangement the carrier may be formed with a tapered surface where it contacts the taper formed on the split collar. A further feature consists in placing a limitation on the compression of the sealing member by arranging that the nonmetallic seal protrudes only a short distance from the face of the carrier. Thereby, when the seal has been compressed by a predetermined amount the metal carrier makes contact with the sealing seat and prevents further compression of the sealing member.

The invention will now be described as applied to an inlet or outlet pipe coupling for a hydraulic pump delivering hydraulic fluid at high pressure. Two specific embodiments are illustrated, by way of example, in the accompanying drawings, in which:

FIG. 1 is an axial section through one construction of coupling means, in accordance with the invention, employing a nonmetallic sealing member, FIG. 2 is an end view of FIG. 1 looking from left to right, and FIG. 3 is a similar view to FIG. 1 but employing a metal sealing member.

Referring to the drawings, the pump body 4 is formed with a bore 5 of such diameter as to receive the end of the pipe 8 but is counterbored, as shown at 6, at its outer end. The counterbore is tapped for the whole of its length, a full-thread portion 7 extending from its outer end to a point 6a where the full-thread tapping ends and a counterbore portion 6b tapers slightly to form a thread runout to a point 6c where it passes into the normal size bore 5 by way of a coarse angle chamfer 9. The normal size bore is then provided with a shoulder 5a for the pipe end to abut and thus to ensure that the pipe 8 extends beyond the sealing member 15 or 15a of the coupling. The tapped portion 7 of the counterbore is adapted to receive a hollow stud 10 the shank of which is externally screwed, as shown at 11, to take into the tapping 7 of the counterbore whilst its inside diameter is plain and dimensioned so that the stud is a sliding fit on the pipe 8. The screwed shank of the stud is of such length that it does not bottom in the tapped portion 7 of the counterbore when screwed home by means of the hexagon head 10a or other tightening means with which it is provided. At the inner end of the stud opposite that with the hexagon head the shank is formed with an internal tapered surface 12 which engages with a corresponding external tapered portion 13 of gripping and sealing means, indicated generally by the reference 14, which projects beyond the end of the shank and is received within the thread runout of the portion 6b of the counterbore.

Several alternative constructions of gripping and sealing means 14 may be provided. Two of such alternatives are illustrated in FIGS. 1 and 3. In each case such gripping and sealing means has an outside diameter only slightly less than the core diameter of the threads 11 on the stud so that it is an easy sliding fit in the thread runout of the portion 6b of the counterbore 6 in the pump body. Also in each construction of the gripping and sealing means the end of the latter away from the aforesaid external tapered portion 13 is oppositely tapered, as shown at 16, and seats against the chamfer 9 by means of which the tapering portion 6b of the counterbore passes into the bore portion 5 of normal size. Such taper 16 of the inner end of the gripping and sealing means 14 may be, and as illustrated is, of somewhat finer angle than the coarse angle of the chamfer 9 against which it seats so that a wedging action will be produced when the gripping and sealing means 14 is subjected to end loading in a manner to be described.

Further features common to the alternative constructions of the gripping and sealing means 14 are the formation of a peripheral lip and mating annular recess or rebate on the gripping and sealing means and the shank of the stud 10 whereby the two parts may be sprung into engagement with each other to form an assembly. Thus, the gripping and sealing means 14 is shown as being formed with a slight, outwardly turned peripheral lip 17 at the outer or smaller diameter end of its tapered portion 13 while the shank of the stud is formed with a slight annular recess or rebate 18 in its bore at the smaller diameter end of its internal tapered surface 12 to receive such lip when the parts are sprung into engagement. Yet a further common feature is that the gripping and sealing means 14 in each case comprises a pipe-gripping collar 19, which is roughened or finely serrated on its inner surface, as shown at 20, and is also split longitudinally at 21 in order to improve its pipe-gripping properties, and the separate nonsplit sealing member 15 or 15a which can be of either a metallic material, as shown in FIG. 3, or nonmetallic material, as shown in FIG. 1.

Where a nonmetallic sealing member 15 (FIG. 1) is employed, a nonsplit part 22 is interposed between the sealing member 15 and the split collar 19; this may take the form of a simple metal washer or, as illustrated, form part of a seal-carrying member 23 so that when the seal 15 is under load there is no possibility of the seal being extruded through the split 21 of the collar 19. The seal-carrying member 23 is formed with a tapered surface 24 to engage a correspondingly tapered surface 25 on the collar. This taper 25 on the collar is of opposite inclination to the taper 13 at its other end and, as a result of this arrangement, the collar 19 is radially compressed at both ends when subjected to end loading in a manner to be described.

The split collar 19 terminates in an outwardly turned peripheral lip 26 which may be sprung into engagement with an annular rebate or recess 27 in the seal carrier 23. The latter has the sealing member 15 attached thereto by means of a lip and rebate formation 28,29 similar to those already described and the sealing member 15 is accordingly attached to the collar 19 through the intermediary of the seal carrier 23. The outside diameters of the collar 19, seal carrier 23 and sealing member 15 are such that these parts are a close fit in the tapering portion 6b of the counterbore 6 of the pump body 4 which terminates in the chamfered seating 9 for the sealing member. The latter is thus wholly contained and trapped in a closed compartment to prevent its extrusion when pressed into sealing engagement with the seating 9.

As already mentioned, the inner end of the shank of the stud 10 is sprung over the collar 19 so that the lip 17 at that end of the collar snaps into the recess or reentrant portion 18 formed on the shank. The collar is thus held as an assembly with the hollow stud, and the sealing member 15 by reason of the sprung fit of its carrier 23 over the lip 26 of the collar is attached thereto, so that the stud 10, collar 19 and sealing member 15 form a one-piece assembly, the collar and sealing member constituting a reduced diameter extension of the end of the shank of the stud.

When the stud 10, with its attached pipe-gripping collar 19 and sealing member 15, is threaded upon the pipe 8 to be coupled to the pump body 4 and is screwed into the latter, the shank of the stud first presses endwise upon the collar which in turn presses the sealing member 15 against the coarse angle chamfered seating 9 to make a seal between the pipe 8 and the pump body 4 to prevent leakage of fluid. Thereafter, continued screwing of the stud into the pump body causes the internal tapered surface 12 of the shank to act upon the external tapered portion 13 of the collar 19 as a result of which the latter is contracted radially inwards to grip the pipe 8 firmly and so prevents its movement even under considerable endwise pressure.

It will be seen that the tapered portion 16 of the plastic seal member 15 protrudes only a short distance from the adjacent end of the seal-carrying member 23 as a result of which, when the sealing member has been pressed against the seating 9 and thereafter compressed by a certain amount under continued screwing of the stud 10 into the pump body, the tapered end 30 of the seal-carrying member 23 makes contact with the seating 9 and thereby prevents further compression and destruction of the sealing member. Furthermore it will be apparent that, with the seal-carrying member 23 in abutment with the seating 9, continued screwing of the stud 10 will cause the seal-carrying member 23 through its tapered surface 24 to react upon the tapered surface 25 of the collar 19, so that the latter is contracted radially inwards at both ends to afford the maximum gripping effect upon the pipe 8. Finally it will be seen that the fact that the collar 19 is split throughout its length is utilized to effect sprung engagement of the sealing member 15 with the collar and of the latter with the stud 10.

Referring now to FIG. 3, the metallic sealing member 15a is similar in shape to the seal and seal-carrying member assembly of FIG. 1. That is to say, the collar 19 and sealing member 15a have lip and rebate formations 26,27a similar to those already described to enable the sealing member to be sprung over the collar to form an assembly. The sealing member is also formed with a tapered surface 24a, similar to the tapered surface 24 of the seal-carrying member 23, to engage with the tapered surface 25 on the collar, and for the same purpose.

I claim:

1. Means for coupling a pipe to a component comprising a hollow stud which is a sliding fit on the pipe, said hollow stud being headed at one end and provided with an externally screwed shank at the other end to thread into a tapped bore in the component, sealing means comprising an annular nonsplit sealing member to provide a seal between the pipe and a seat in the component, a longitudinally split pipe-gripping collar adapted to surround the pipe and to grip and retain the latter against hydraulic end loading, screwing the hollow stud into the component resulting in radial compression of the collar to grip the pipe and in compression of the sealing member against the seat to provide said seal, the split of said collar being sufficiently wide to permit the sealing means and split collar to be removably sprung into engagement with the shank of the hollow stud to provide a one-piece assembly, with the stud, collar and sealing means of the assembly maintained in alignment and the elastic limit of the sealing means not being exceeded upon said compression so that by mere slackening of the stud the pipe is released and can be withdrawn, and refitted, without removing the stud from the component.

2. Coupling means according to claim 1, wherein said collar has an external taper at the end remote from the sealing means and said hollow stud has an internal taper which engages said external taper, as the stud if screwed into the component, to compress said collar radially on to the pipe to grip and retain the latter.

3. Coupling means according to claim 2, wherein said internal taper is formed towards the free end of the screwed shank of the hollow stud at the back of an internal annular end recess into which the split collar is sprung for removable attachment thereof, thus reserving for the remaining major length of the stud shank the maximum wall thickness available between the root diameter of the shank thread and the outer diameter of the tube.

4. Coupling means according to claim 1, wherein said sealing means comprise said sealing member and a metallic seal carrier, and sealing member being nonmetallic and forming with the carrier a one-piece subassembly, and the split collar is removably sprung into engagement with said seal carrier.

5. Means for coupling a pipe to a component, comprising a hollow stud which is a sliding fit on the pipe, said hollow stud being headed at one end and provided with an externally screwed shank at the other end to thread into a tapped bore in the component, a longitudinally split pipe-gripping collar to surround and grip the pipe whereby to retain the latter against hydraulic end loading, and nonsplit sealing means adapted to surround the pipe and to provide upon compression a seal between the latter and a seat in the component with the elastic limit of the sealing means not being exceeded upon said compression, the shank of the stud having an internal taper and the collar an external end taper, said tapers engaging and cooperating to compress the collar radially to grip the pipe as the stud is screwed into the component, the stud shank, collar and sealing means being arranged in tandem and the resilience of the split collar and the width of the split of said collar being sufficient to provide a removable attachment of the collar to the shank and of the sealing means to the collar.

6. Coupling means according to claim 5, wherein said sealing means comprise a nonsplit metallic carrier and a nonmetallic sealing member providing a one-piece subassembly, the stud shank, collar, seal carrier and sealing member being arranged in tandem, with the carrier removably attached to the collar.

7. Coupling means according to claim 5, wherein the collar clips inside the free end of said shank and has a peripheral external lip, adjacent said external taper, which engages an internal recess adjacent said internal taper to provide the removable attachment of the collar to the stud.

8. Coupling means according to claim 5, wherein said pipe-gripping collar clips inside the adjacent end of said sealing means for the removable attachment thereof, said collar having a peripheral external lip adjacent the end remote from the screwed shank and said sealing means having an internal recess which is engaged by said lip when the collar and sealing means are sprung into engagement utilizing the natural resilience and radial compressibility of the collar.

9. Coupling means according to claim 5, wherein said sealing means comprise a nonmetallic sealing member which seals against said seat in the component and a metallic seal carrier by which the sealing member is carried, said carrier being sprung into engagement with the adjacent end of the collar to provide the removable attachment of the sealing means.

10. Coupling means according to claim 9, wherein said nonmetallic sealing member clips on to the adjacent end of the carrier from which end the sealing member projects for engagement with said seat in the component, when the stud is fully tightened said end of the carrier engaging the component so that the carrier, the seat and the tube define between them a closed annular recess in which the sealing member is confined so as to be compressed into sealing engagement with the seat and the tube, such confinement preventing the sealing member from being extruded from its sealing position along the tube or the tapped bore under hydraulic pressure within the component.